(12) United States Patent
Moro

(10) Patent No.: US 11,032,439 B2
(45) Date of Patent: Jun. 8, 2021

(54) IMAGE PROCESSING APPARATUS

(71) Applicants: KABUSHIKI KAISHA TOSHIBA, Tokyo (JP); TOSHIBA TEC KABUSHIKI KAISHA, Tokyo (JP)

(72) Inventor: Akihiro Moro, Sunto Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/715,397

(22) Filed: Dec. 16, 2019

(65) Prior Publication Data

US 2020/0120226 A1    Apr. 16, 2020

Related U.S. Application Data

(63) Continuation of application No. 15/936,557, filed on Mar. 27, 2018, now abandoned.

(30) Foreign Application Priority Data

Aug. 1, 2017   (JP) .............................. JP2017-148919

(51) Int. Cl.
*H04N 1/00* (2006.01)
*G06K 9/46* (2006.01)
*G06K 9/00* (2006.01)

(52) U.S. Cl.
CPC .......... *H04N 1/00742* (2013.01); *G06K 9/46* (2013.01); *H04N 1/00795* (2013.01); *G06K 9/00442* (2013.01)

(58) Field of Classification Search
CPC .......... H04N 1/00742; H04N 1/00795; H04N 1/00816; H04N 1/38; G06K 9/46; G06K 9/00442
See application file for complete search history.

(56) References Cited

U.S. PATENT DOCUMENTS 5,719,386 A * 2/1998 Hsieh ................... G06K 9/2054
                                                    235/470
6,101,283 A * 8/2000 Knox ................... H04N 1/4095
                                                    358/463
7,194,217 B2   3/2007 Hosoi
(Continued)

FOREIGN PATENT DOCUMENTS

JP      2002-10059 A   ‡   1/2002
JP      2002010059 A       1/2002
(Continued)

OTHER PUBLICATIONS

Japanese Office Action dated Mar. 16, 2021, mailed in counterpart Japanese Application No. 2017-148919, 10 pages (with translation).

*Primary Examiner* — Iriana Cruz
(74) *Attorney, Agent, or Firm* — Kim & Stewart LLP

(57) ABSTRACT

An image processing apparatus comprises a memory configured to store a scanned image obtained by scanning a document placement area, and a processor configured to detect an image of each original document from the scanned image, specify a placement state of each original document, and generate data in a data format corresponding to the placement state of each original document in the image.

17 Claims, 11 Drawing Sheets

| PLACEMENT STATE | | DATA FORMAT |
|---|---|---|
| FIRST SHEET | SECOND SHEET | |
| VERTICAL | VERTICAL | STORE INDIVIDUALLY |
| VERTICAL | HORIZONTAL | STORE COLLECTIVELY |
| HORIZONTAL | VERTICAL | STORE COLLECTIVELY BY CHANGING ORDER |
| HORIZONTAL | HORIZONTAL | STORE COLLECTIVELY BY ADDING MARGIN |

(56) References Cited

U.S. PATENT DOCUMENTS

| | | | |
|---|---|---|---|
| 2005/0111894 A1 | 5/2005 | Hosoi | |
| 2011/0002015 A1* | 1/2011 | Hayakawa | H04N 1/00816 |
| | | | 358/448 |
| 2011/0102858 A1 | 5/2011 | Iguchi | |
| 2015/0146265 A1* | 5/2015 | Kim | H04N 1/3872 |
| | | | 358/450 |
| 2017/0083762 A1* | 3/2017 | Segalovitz | G06K 9/00463 |
| 2017/0230523 A1‡ | 8/2017 | Nakajima | H04N 1/00525 |
| 2018/0293731 A1* | 10/2018 | Palaniyappan | G06K 9/3233 |

FOREIGN PATENT DOCUMENTS

| | | |
|---|---|---|
| JP | 2005017809 A | 1/2005 |
| JP | 2005159766 A | 6/2005 |
| JP | 2006253937 A | 9/2006 |
| JP | 2010135977 A | 6/2010 |
| JP | 2011040971 A | 2/2011 |

\* cited by examiner
‡ imported from a related application

FIG.3

| PLACEMENT STATE ||  DATA FORMAT |
|---|---|---|
| FIRST SHEET | SECOND SHEET ||
| VERTICAL | VERTICAL | STORE INDIVIDUALLY |
| VERTICAL | HORIZONTAL | STORE COLLECTIVELY |
| HORIZONTAL | VERTICAL | STORE COLLECTIVELY BY CHANGING ORDER |
| HORIZONTAL | HORIZONTAL | STORE COLLECTIVELY BY ADDING MARGIN |

FIG.8

| READING ORDER | DOCUMENT INFORMATION | |
| --- | --- | --- |
| | POSITION | SIZE |
| 1 | dx1,dy1 | X1,Y1 |
| 2 | dx2,dy2 | X2,Y2 |
| 3 | dx3,dy3 | X3,Y3 |

IMAGE PROCESSING APPARATUS

CROSS-REFERENCE TO RELATED APPLICATIONS

This application is a continuation of U.S. patent application Ser. No. 15/936,557, filed on Mar. 27, 2018, which is based upon and claims the benefit of priority from Japanese Patent Application No. 2017-148919, filed Aug. 1, 2017, the entire contents of each of which are incorporated herein by reference.

FIELD

Embodiments described herein relate generally to an image processing apparatus.

BACKGROUND

There is an image processing apparatus which scans a plurality of original documents at once and extracts an image of each original document from a scanned image. The technology is referred to as multi-cropping processing. The image processing apparatus stores images of each extracted original document as a file according to data format specified by a user through an operation section or the like.

Conventionally, the user has to manually specify the data format.

DESCRIPTION OF THE DRAWINGS

FIG. 3 is a diagram of a setting table used in the embodiment;

FIG. 8 is a diagram of a document table used in the embodiment;

DETAILED DESCRIPTION

In accordance with an embodiment, an image processing apparatus comprises a memory configured to store a scanned image obtained by scanning a document placement area, and a processor configured to detect an image of each original document from the scanned image, specify a placement state of each original document, and generate data in a data format corresponding to the placement state of each original document in the image.

Hereinafter, an embodiment is described with reference to the accompanying drawings.

An image processing apparatus according to the embodiment executes a multi-cropping processing that includes scanning a plurality of original documents at once and extracting an image of the original document. The image processing apparatus stores an image of each original document in a file in a predetermined data format after the multi-cropping processing is executed. For example, the image processing apparatus selects one data format from a plurality of data formats, such as a data format for storing each of the images in a separate file or a data format for storing the images in one file.

The image processing apparatus may output the file to a medium.

The image processing apparatus may print the file on a sheet. The image processing apparatus may make a copy of the original document according to the data format.

Figure 1:
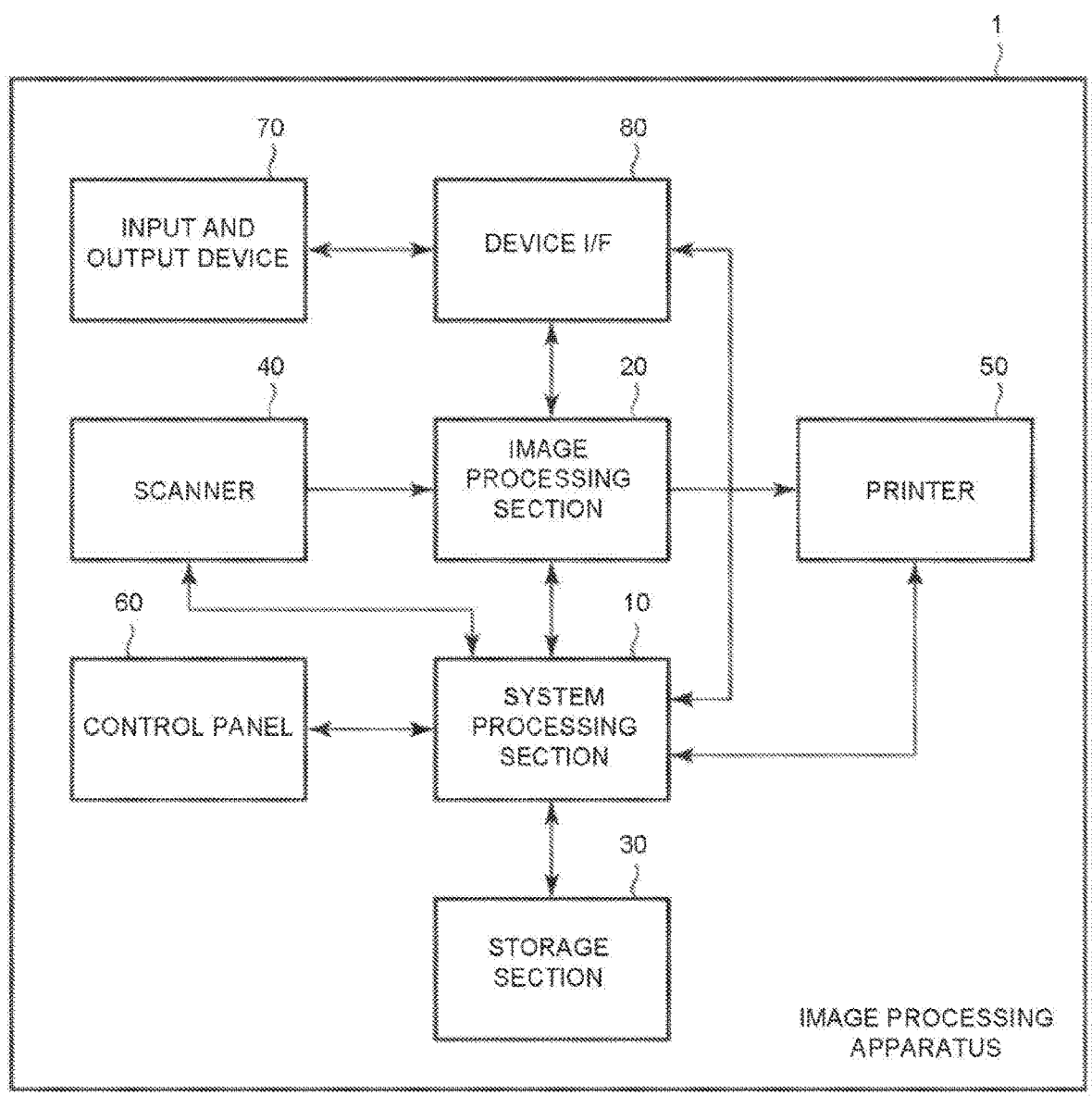
FIG. 1 is a block diagram of an image processing apparatus according to an embodiment.

FIG. 1 is a block diagram of an image processing apparatus 1. As shown in FIG. 1, the image processing apparatus 1 includes the following hardware components: a system processing section 10, an image processing section 20, a storage section 30, a scanner 40, a printer 50, a control panel 60, an input and output device 70 and a device interface 80.

The system processing section 10 controls the image processing apparatus 1. The system processing section 10 transmits and receives data to and from each section via a data bus line or the like. For example, the system processing section 10 controls the scanner 40 to acquire a scanned image obtained by scanning an original document set in the scanner 40. The system processing section 10 executes a multi-cropping processing based on the scanned image. The system processing section 10 is described in detail later.

The image processing section 20 processes the scanned image acquired through the scanner 40. The image processing section 20 sends the scanned image to the system processing section 10. The image processing section 20 carries out a process of increasing an image quality of the scanned image. The image processing section 20 may transmit the scanned image to the printer 50. The image processing section 20 is described in detail later.

The storage section 30 stores a document table under control of the system processing section 10. The document table is described later.

The storage section 30 is a nonvolatile memory in which data can be written and rewritten. The storage section 30 is for example, a HDD (Hard Disk Drive), a SSD (Solid State Drive), an EEPROM® or a flash memory.

The storage section 30 may be included in the system processing section 10 as a memory.

The scanner 40 scans an original document placement area (e.g., a document platen) in which the original document can be placed. The scanner 40 generates a scanned image. The scanner 40 includes a sensor having a plurality of reading pixels (for example, photoelectric conversion elements) in a main scanning direction. The scanner 40 moves the sensor in a sub-scanning direction that is orthogonal to the main scanning direction. The scanner 40 reads out the original document on the document platen by moving the sensor in the sub-scanning direction. The scanner 40 may have illumination for illuminating the original document. The scanner 40 sends the scanned image to the image processing section 20 and the system processing section 10.

The scanner 40 may be provided with a sensor for sensing light from a carriage moving in the sub-scanning direction.

The printer 50 prints an image on a sheet based on a signal from the system processing section 10.

The printer 50 prints the image data on the sheet with, for example, an inkjet system or an electrophotographic system. The printer 50 may include a sheet supply section that supplies the sheet on which an image is printed, a sheet conveyance section that conveys the sheet, and a printing section that prints an image on the sheet.

Various instructions are input to the control panel 60 by a user of the image processing apparatus 1. The control panel 60 transmits a signal indicating the operation input by the user to the system processing section 10. The control panel 60 includes, for example, a keyboard, a numeric keypad, a touch panel, and the like as an operation section.

The control panel 60 displays various information to the user of the image processing apparatus 1. The control panel 60 displays a screen indicating various information based on the signal from the system processing section 10. The control panel 60 includes, for example, a liquid crystal display as a display section.

The input and output device 70 is used for storing a file in which the document image of the original document extracted from the scanned image is stored in the predetermined data format. For example, the input and output device 70 is a removable memory (e.g., a USB memory). The input and output device 70 may support LAN connection. In this case, the system processing section 10 sends the file to an external device via the LAN connection.

The input and output device 70 may provide a scanned image to the image processing section 20.

The device interface 80 is used for transmitting and receiving data to and from the input and output device 70. The system processing section 10 transmits and receives data to and from the input and output device 70 through the device interface 80. For example, the device interface 80 may support a USB connection.

Next, the system processing section 10 and the image processing section 20 are described.

Figure 2:
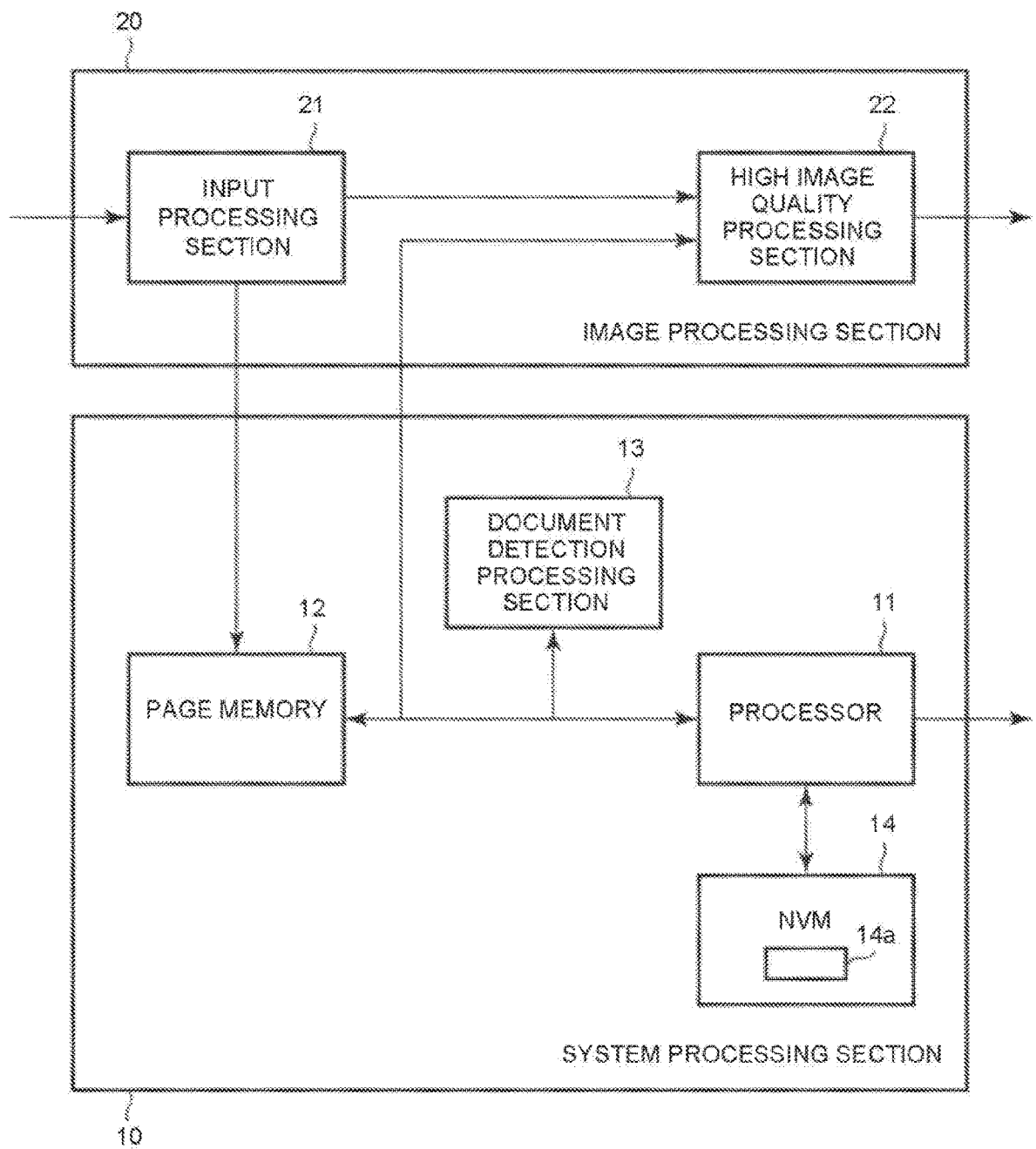
FIG. 2 is a block diagram of a system processing section and an image processing section according to the embodiment.

FIG. 2 is a block diagram of the system processing section 10 and the image processing section 20.

As shown in FIG. 2, the system processing section 10 includes a processor 11, a page memory 12, a document detection processing section 13 and a NVM 14. The processor 11 is connected to each section via a data bus line or the like.

The processor 11 has a function of controlling the overall operation of the system processing section 10. The processor 11 may include an internal memory and various interfaces. The processor 11 executes various processing by executing programs stored in advance in the internal memory or the NVM 14.

A part of the various functions realized by the processor executing the program may be realized by a hardware circuit.

The page memory 12 stores the scanned image from the image processing section 20. If the scanner 40 completes the scanning, the page memory 12 stores the scanned image from the scanner 40. For example, the page memory 12 stores the scanned image in a volatile manner.

The document detection processing section 13 detects the individual document image from the scanned image. The document detection processing section 13 specifies an order, a position and a size of the document image from the scanned image. For example, the document detection processing section 13 specifies an area of the original document by extracting edges from the scanned image. The document detection processing section 13 specifies the order, the position and the size of the document area. The document detection processing section 13 determines the order of each original document in the sub-scanning direction. The document detection processing section 13 determines a reading order of each original document. The document detection processing section 13 specifies coordinates in the scanned image as the position. Here, the main scanning direction is an X axis, and the sub scanning direction is a Y axis. The document detection processing section 13 identifies the X coordinate and the Y coordinate as the position of the original document. The document detection processing section 13 may specify a center of the original document as the position of the original document or specify a predetermined vertex of the original document as the position of the original document.

The document detection processing section 13 specifies a length in the X axis direction and a length in the Y axis direction as the size of the original document.

If a plurality of the original documents is in the scanned image, the document detection processing section 13 specifies the position and the size of each image.

The function of document detection processing section 13 may be realized by execution of the program by the processor 11.

The NVM 14 is a nonvolatile memory in which data can be written and rewritten. The NVM 14 may be for example, a HDD (Hard Disk Drive), a SSD (Solid State Drive), an EEPROM® or a flash memory. The NVM 14 stores control programs, applications, various data and the like according to an operation purpose of the system processing section 10.

The NVM 14 has a storage area 14a for storing a setting table. The setting table is described in detail later.

As shown in FIG. 2, the image processing section 20 includes an input processing section 21 and a high image quality processing section 22. The input processing section 21 and the high image quality processing section 22 are connected to each section via a data bus line or the like.

The input processing section 21 acquires a scanned image from the scanner 40. The input processing section 21 stores the scanned image in the page memory 12. The input processing section 21 may execute a processing for correcting a gradation with respect to the scanned image. For example, the input processing section 21 executes a gradation correction by correcting relatively low density image data, e.g., near white portions, to be of even lower density, e.g., entirely white or almost entirely white. The input processing section 21 may acquire the scanned image from the input and output device 70.

The high image quality processing section 22 executes a processing of increasing the image quality of the document image extracted from the scanned image. For example, the high image quality processing section 22 executes a filter processing, a variable magnification processing, a density adjustment processing or a gradation processing on the document image.

The function of the high image quality processing section may be realized by execution of the program by the processor 11.

Next, the setting table is described.

The setting table is a table in which the placement state of the original document is associated with the data format of the document image. The setting table is used for setting the data format according to the placement state of the original document.

The placement state of the original document indicates the orientation of the original document based on a shape of the original document. For example, the placement state is the orientation in which the user places the original document on the scanner 40. Here, there are two types of the placement state of the original document; they are vertical placement and horizontal placement. The vertical placement is a state in which a long side of the original document is placed along the main scanning direction (X axis direction). The horizontal placement is a state in which the long side of the original document is placed along the sub-scanning direction (Y axis direction).

The data format indicates the data format of the document image. The data format is a structure of a file that stores the document image.

FIG. 3 shows an example of the setting table.

As shown in FIG. 3, the setting table stores the "placement state" and the "data format" in an associated manner. Here, the setting table defines the data format according to the placement state of the two original documents.

The "placement state" is defined for a "first sheet" and a "second sheet".

The "first sheet" indicates the placement state of the original document preceding in the sub-scanning direction. The "first sheet" indicates the placement state of the original document read first.

The "second sheet" indicates the placement state of the original document following the original document after the "first sheet" in the sub-scanning direction. The "second sheet" indicates the placement state of the original document which is read second.

The setting table indicates whether the placement state of the "first sheet" or the "second sheet" is "vertical" or "horizontal". The "vertical" indicates the vertical placement. The "horizontal" indicates the horizontal placement.

Next, the "data format" is described.

As shown in FIG. 3, the "data format" is one of "store individually", "store collectively", "store collectively by changing order" and "store by adding a margin".

The "store individually" indicates a format in which each of the document images is stored as individual data. The "store individually" indicates that a file for storing the first original document and a file for storing the second original are generated.

The "store collectively" indicates a format in which each document image is set as one data. The "collectively store" indicates that a file, in which the first document is stored on the first page and the second document is stored on the second page, is generated.

The "store collectively by changing order" indicates a format in which each document image is set as one data in a reverse order to the reading order of the original document. The "store collectively by changing order" indicates that a file, in which the second original document is stored on the first page and the first original document is stored on the second page, is generated.

The "store collectively by adding margin" indicates a format in which a blank page is inserted between the document images. The "store collectively by adding margin" indicates that a file, in which the first original document is stored on the first page, the blank is stored on the second page, and the second original document is stored on the third page, is generated.

The "data format" may be a data format such as 2 in 1 which combines the two document images on one page. The "data format" may be a data format in which the document image is color data or monochrome data.

The "placement state" may be the orientation of one original document or three or more original documents.

Next, the relationship between the "placement state" and the "data format" is described.

Figure 4:
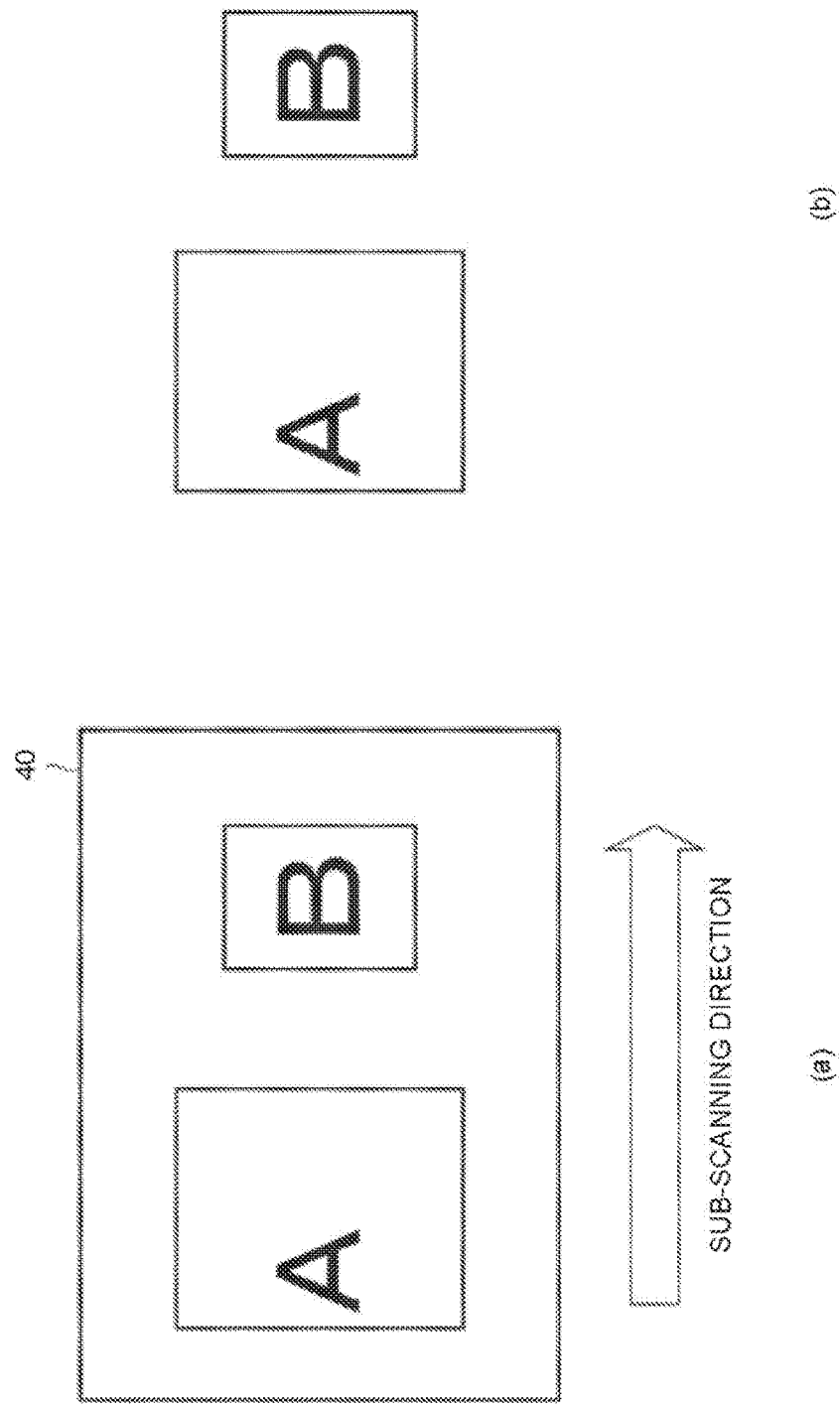
FIGS. 4-7 are each a diagram illustrating an example of a data format used in the embodiment.

FIG. 4 shows an example of a case in which the user vertically places the two original documents. FIG. 4(a) shows the "placement state" of the original documents. FIG. 4(b) shows the "data format". Here, the user sets the original document A and the original document B in the scanner 40.

As shown in FIG. 4(a), both the original document A and the original document B are vertically placed. Therefore, the "data format" is "store individually".

As shown in FIG. 4(b), the processor 11 stores the original document A in one file and stores the original document B in a different file.

Figure 5:
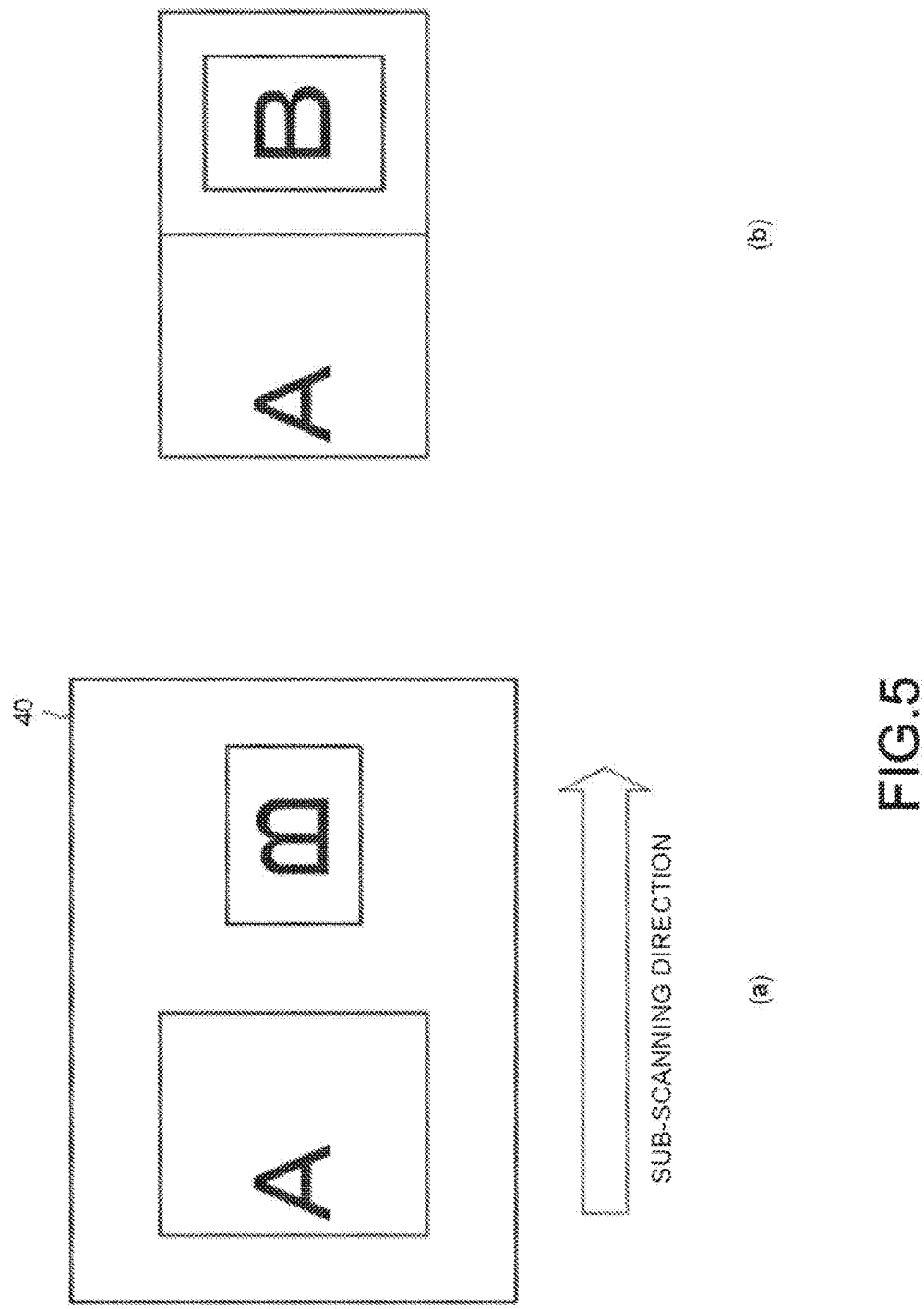

FIG. 5 shows an example in the case in which the user horizontally places the second original document B and places the first original document A vertically. FIG. 5(a) shows the "placement state" of the original documents. FIG. 5(b) shows the "data format".

As shown in FIG. 5(a), the original document A is vertically placed. The original document B is horizontally placed. Therefore, the "data format" is "collectively store".

As shown in FIG. 5(b), the processor 11 stores the original document A and the original document B in the file. Here, the original document A is larger than the original document B. In the example shown in FIG. 5(b), a size of the page in the file is adjusted to match the original document A. The original document B is located at the center of the second page.

Figure 6:
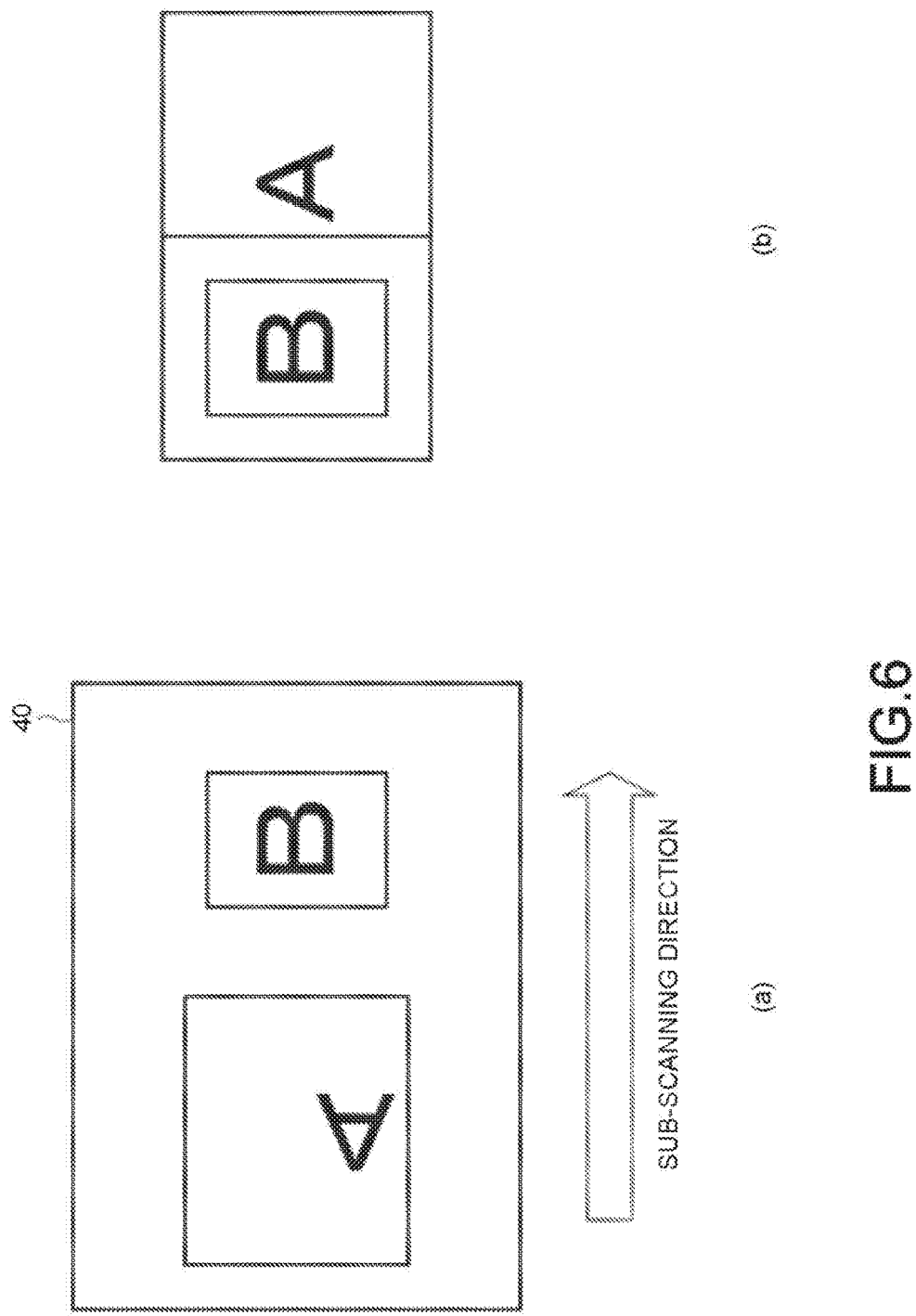

FIG. 6 shows a case in which the user horizontally places the first original document A and vertically places the second original document B. FIG. 6(a) shows the "placement state" of the original documents. FIG. 6(b) shows the "data format".

As shown in FIG. 6(a), the original document A is horizontally placed. The original document B is vertically placed. Therefore, the "data format" is "store by changing order".

As shown in FIG. 6(b), the processor 11 stores the original document A and the original document B in a file by changing the order. The first page of the file is the original document B, and the second page is the original document A. The size of the page in the file matches the original document A. The original document B is placed at the center of the first page.

Figure 7:
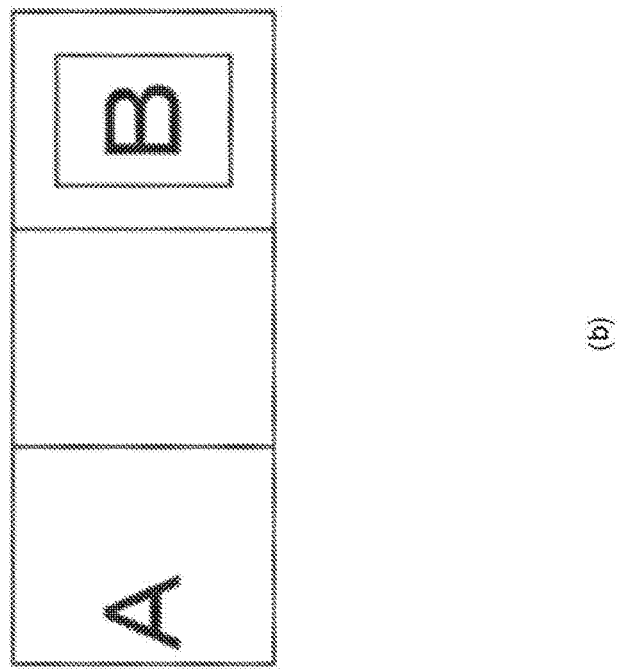
Figure 7:
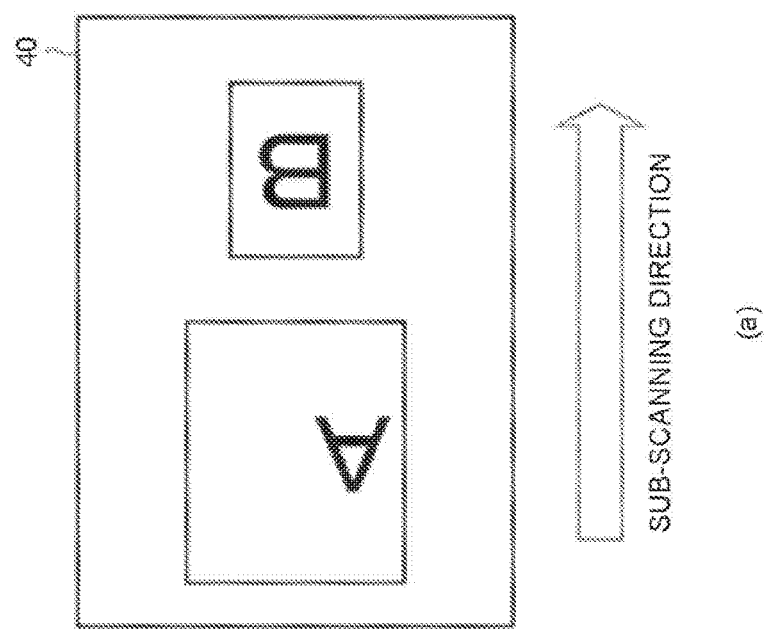

FIG. 7 shows a case in which the user horizontally places the first original document A and the second original document B. FIG. 7(a) shows the "placement state" of the original documents. FIG. 7 (b) shows the "data format". As shown in FIG. 7 (a), the original document A and the original document B are both horizontally placed. Therefore, the "data format" is "store collectively by adding margin".

As shown in FIG. 7(b), the processor 11 adds a blank page therebetween and stores the original document A and the original document B in the file. The first page of the file is the original document A, the second page is the blank page, and the third page is the original document B. The size of the page in the file matches the original document A. The original document B is placed at the center of the third page.

The setting table is stored in the storage area 14a in advance. The setting table may be stored in the storage area 14a at the time of manufacturing the image processing apparatus 1. The setting table may be updated as appropriate. For example, the setting table may be updated according to an operation by the user.

Next, functions realized by the processor 11 are described. The following functions are realized by execution of the program stored in the NVM 14 by the processor 11.

First, the processor 11 has a function of presenting the content of the setting table to the user.

The processor 11 controls the control panel 60 to display the content of the setting table. For example, the processor controls the control panel 60 to display an image indicating the placement state of the original document and the data format corresponding to the placement state in an associated manner. The processor 11 may receive an operation of updating the content of the setting table.

The processor 11 has a function of acquiring the scanned image obtained by scanning the original document.

For example, the processor 11 receives an operation to start the scan through the control panel 60. Here, the user sets the original document on the document platen of the scanner 40, and inputs an operation to start the scan to the control panel 60.

Upon receiving the input of the operation, the processor 11 transmits a signal to start the scan to the scanner 40. The scanner 40 receives the signal to perform the scan. The scanner 40 sends the scanned image to the image processing section 20. The input processing section 21 of the image processing section 20 stores the scanned image in the page memory 12 after executing a predetermined processing on the scanned image.

The processor 11 has a function of acquiring the order, the position and the size of each original document in the scanned image.

The processor 11 acquires the order, the position and the size of the original document from the acquired scanned image using the document detection processing section 13. For example, the processor 11 transmits a signal for specifying the order, the position and the size of each original document from the scanned image stored in the page memory 12 to the document detection processing section 13. The processor 11 acquires the order, the position and the size of each original document from the document detection processing section 13.

The processor 11 generates the document table indicating the order, the position and the size of each original document.

FIG. 8 shows an example of the document table. As shown in FIG. 8, the document table stores a "reading order" and "document information" in association with each other. The "document information" includes a "position" and a "size".

The "reading order" indicates the order in which the scanner 40 reads the original documents. The "reading order" is an order in which the original documents are placed in the sub-scanning direction.

The "position" indicates a position where the original document is placed. The "position" is defined by the X coordinate (dxn) and the Y coordinate (dyn).

The "size" indicates the size of the original document. The "size" is defined by a length (Xn) in the X axis direction and a length (Yn) in the Y axis direction.

The processor 11 stores the generated document table in the storage section 30.

The processor 11 also has a function of extracting the document image from the scanned image.

The processor 11 acquires the document table. The processor 11 acquires the "position" and the "size" from the document table. The processor 11 extracts the document image from the scanned image based on the "position" and the "size".

The processor 11 may execute a processing of correcting a skew on the document image. The processor 11 may improve the image quality of the document image using the high image quality processing section 22.

The processor 11 also has a function of determining the placement state of each original document based on the document table. The processor 11 determines whether each original document is placed vertically or horizontally.

The processor 11 acquires the document table from the storage section 30. The processor 11 acquires the "size" from the document table. The processor 11 determines the placement state of the original document from $X_n$ and $Y_n$ in the "size".

If $X_n > Y_n$, the processor 11 determines that the original document is placed vertically. If $X_n < Y_n$, the processor 11 determines that the original document is placed horizontally.

The processor 11 also has a function of storing the document image in the file with the data format corresponding to the placement state of each original document.

Here, the processor 11 selects the data format corresponding to the placement state of the first original document and the placement state of the second original document.

The processor 11 refers to the setting table to acquire the data formats corresponding to the placement state of the first original document and the placement state of the second original document. The processor 11 generates the file of each document image according to the acquired data format.

The processor 11 controls the control panel 60 to display the file generated according to the determined data format. The processor 11 stores the generated file according to the operation from the user.

For example, the processor 11 may store the file in the input and output device 70. The processor 11 may cause the generated file to be transmitted to the external device.

If the image processing apparatus 1 copies the original document, the processor 11 stores the file in an internal memory such as the NVM 14. The processor 11 may control the printer 50 to print the file stored in the internal memory. The printer 50 prints each document image according to the data format.

The processor 11 may store the third and subsequent original documents according to the data formats corresponding to the placement state of the first original document and the placement state of the second original document.

The processor 11 may store the document image according to the data format corresponding to the placement state of the first original document. The processor 11 may store the document image according to the data format corresponding to the placement state of three or more original documents.

Next, an operation example of the image processing apparatus 1 is described.

Figure 9:
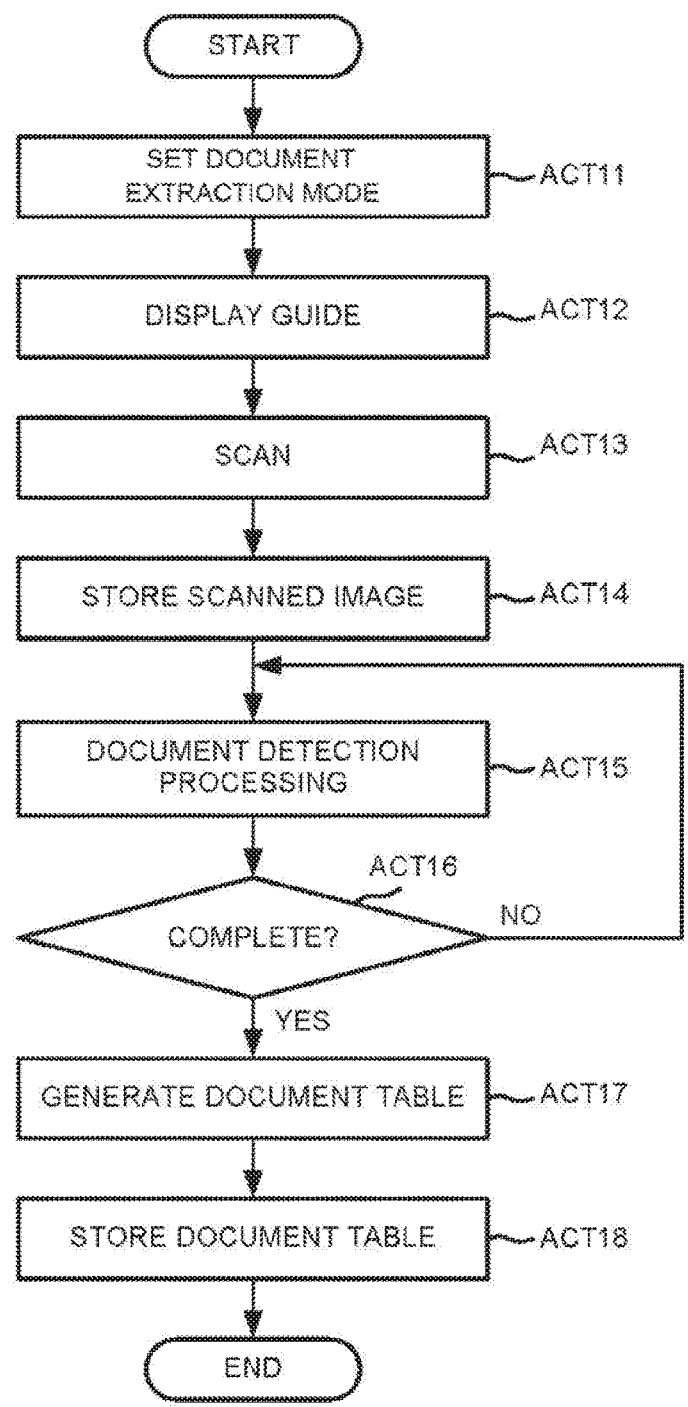
FIG. 9 is a flowchart of an operation in which the image processing apparatus according to the embodiment generates and stores the document table.

First, an operation example in which the image processing apparatus 1 stores the document table is described. FIG. 9 is a flowchart illustrating an operation example in which the image processing apparatus 1 stores the document table.

First, the processor 11 of the image processing apparatus 1 sets a document extraction mode for executing the multi-cropping processing (ACT 11). For example, the processor 11 sets the document extraction mode based on an operation from the user or in a default state.

If the document extraction mode is set, the processor 11 controls the control panel 60 to display a guide for presenting the content of the setting table to the user (ACT 12). If the guide is displayed, the processor 11 controls the scanner 40 to scan the original document (ACT 13). For example, if the processor 11 receives an operation to start the scan, the processor 11 proceeds to the processing in ACT 13.

If the original document is scanned, the processor 11 stores the scanned image in the page memory 12 (ACT 14). If the scanned image is stored, the processor 11 executes a detection processing for detecting the original document using the document detection processing section 13 to generate the document information (ACT 15).

If the detection processing is executed, the processor 11 determines whether or not the detection processing is executed on the entire scanned image (ACT 16). If it is determined that the detection processing is not executed on the entire scanned image (No in ACT 16), the processor 11 returns to the processing in ACT 15.

If it is determined that the detection processing is executed on the entire scanned image (Yes in ACT 16), the processor 11 generates the document table based on the generated document information (ACT 17). If the document table is generated, the processor 11 stores the generated document table in the storage section 30 (ACT 18). If the document table is stored in the storage section 30, the processor 11 ends the operation.

Next, an operation example in which the image processing apparatus 1 stores the file is described.

Figure 10:
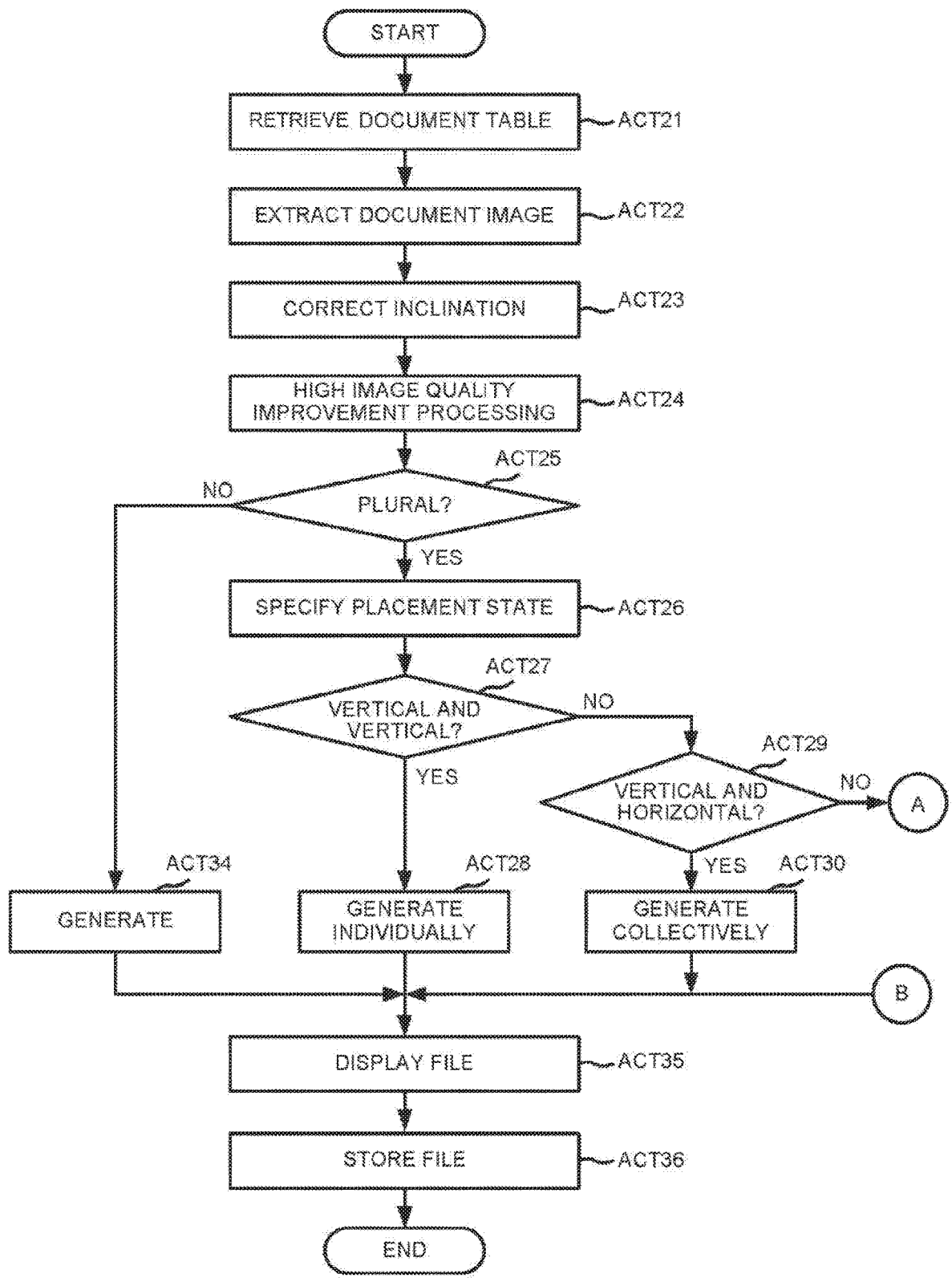
FIG. 10 is a flowchart of an operation in which the image processing apparatus according to the embodiment stores a file.
Figure 11:
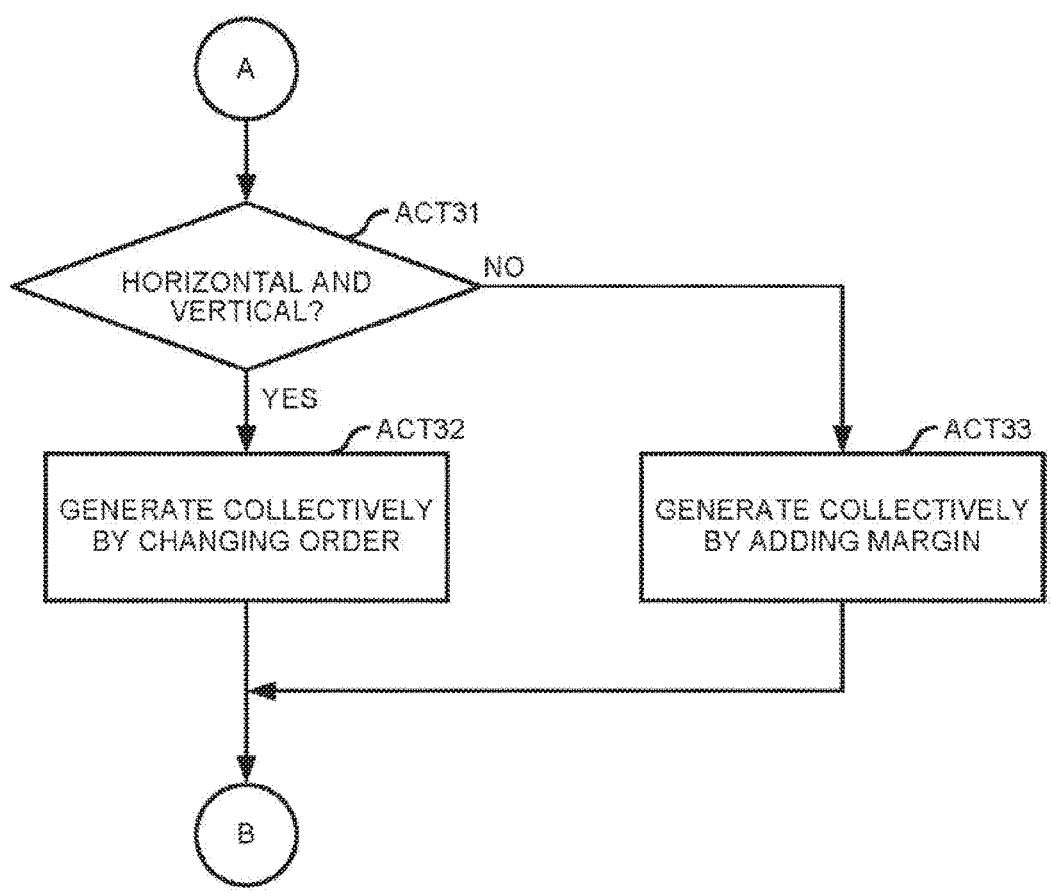
FIG. 11 is a flowchart of the operation in which the image processing apparatus according to the embodiment stores a file.

FIG. 10 and FIG. 11 are flowcharts illustrating an operation example in which the image processing apparatus 1 stores the file.

First, the processor 11 of the image processing apparatus 1 retrieves the document table from the storage section 30 (ACT 21). If the document table is retrieved, the processor 11 extracts the document image from the scanned image based on the document table (ACT 22).

If the document image is extracted, the processor 11 corrects an inclination of the document image (ACT 23). If the inclination of the document image is corrected, the processor 11 improves the image quality of the document image using the high image quality processing section 22 (ACT 24).

If the image quality of the document image is improved, the processor 11 determines whether or not there is a plurality of document images (ACT 25). If it is determined that there is a plurality of document images (Yes in ACT 25), the processor 11 specifies the placement state of each original document (ACT 26).

If the placement state of each original document is specified, the processor 11 determines whether or not the first original document is placed vertically and the second original document is placed vertically (ACT 27). If it is determined that the first original document is placed vertically and the second original document is placed vertically (Yes in ACT 27), the processor 11 generates individual files from each document image according to the setting table (ACT 28).

If it is determined that the first original document is not placed vertically and the second original document is not placed vertically (No in ACT 27), the processor 11 determines whether or not the first original document is placed vertically and the second original document is placed horizontally (ACT 29). If it is determined that the first original document is placed vertically and the second original document is placed horizontally (Yes in ACT 29), the processor 11 generates one file from each document image according to the setting table (ACT 30).

If it is determined that the first original document is not placed vertically and the second original document is not placed horizontally (No in ACT 29), the processor 11 determines whether or not the first original document is placed horizontally and the second original document is placed vertically (ACT 31). If it is determined that the first original document is placed horizontally and the second original document is placed vertically (Yes in ACT 31), the processor 11 generates one file by changing the order from the first document image and the second document image according to the setting table (ACT 32).

If it is determined that the first original document is placed horizontally and the second original document is placed vertically (No in ACT 31), the processor 11 generates a file from the first document image and the second document image by adding the blank page therebetween (ACT 33).

If it is determined that the number of the document image is one (No in ACT 25), the processor 11 generates a file from the document image (ACT 34).

If an individual file is generated from each document image (ACT 28), if one file is generated from each document image (ACT 30), if one file is generated by changing the order (ACT 32), if the file is generated by adding the blank page therebetween (ACT 33) or if the file is generated from the document image (ACT 34), the processor 11 controls the control panel 60 to display the generated file (ACT 35).

If the output file is displayed on the control panel 60 (ACT 35), the processor 11 stores the file in the input and output device 70 (ACT 36). If the file is stored, the processor 11 ends the operation.

In the case of make a copy of the scanned original document, the processor 11 control the printer 50 to print the file. If the individual file is generated from each document image, the processor 11 may control the printer 50 to print each original document on one side. The processor 11 may control the printer 50 to print each original document on a sheet that matches the largest size of the original document. The processor 11 may control the printer 50 to perform the printing on a sheet having a size suitable for each original document.

If one file is generated from each document image, if one file is generated by changing the order, or if the file is generated by adding the blank page therebetween, the processor 11 may control the printer 50 to print each original document on both sides. For example, the processor 11 may control the printer 50 to print each original document on a sheet that matches the largest size of the original document.

The image processing apparatus described above specifies the placement state of the original document placed in the scanner. The image processing apparatus stores the document image in the file according to the data format corresponding to the specified placement state. As a result, the image processing apparatus can set the data format without receiving the input of the data format from the user through the operation section or the like. Thus, the image processing apparatus can efficiently set the data format.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus, comprising:
   a memory;
   an internal memory to store a scanned image of a document placement area; and
   a processor configured to:
   detect original documents in the scanned image,
   identify an orientation and position of each original document detected in the scanned image, and
   select between saving each detected original document individually in separate files or together in one file according to the identified orientation and position of the original documents, wherein the memory stores relationships between a data format for saving the original documents and the orientations and placements of original documents in the document placement area, and the processor selects between saving each detected original document in separate files or together in a single file based on the stored relationships in the memory.

2. The image processing apparatus according to claim 1, wherein the processor is further configured to identify whether each original document is vertically or horizontally oriented in the document placement area.

3. The image processing apparatus according to claim 1, wherein the processor is further configured to generate image data separately for each original document detected in the scanned image.

4. The image processing apparatus according to claim 3, further comprising:
a printer configured to print an image on a sheet based on the generated image data.

5. The image processing apparatus according to claim 1, further comprising:
a scanner configured to generate the scanned image, wherein
the processor is further configured to store images of each original document in a storage device.

6. The image processing apparatus according to claim 1, wherein the processor is further configured to correct an inclination of the original documents in the scanned image.

7. The image processing apparatus according to claim 1, wherein the processor is further configured to change an image quality parameter of images of the original documents in the scanned image.

8. The image processing apparatus according to claim 7, wherein the processor changes the image quality parameter of images of the original documents using at least one of a filter processing, a variable magnification processing, a density adjustment processing, and a gradation processing.

9. A method of processing scanned images, comprising:
storing a scanned image obtained by scanning a document placement area;
detecting original documents in the scanned image;
identifying an orientation and a position of each detected original document in the scanned image; and
selecting between saving each detected original document individually in separate files or together in one file according to the identified orientation and position of the original documents in the scanned image, wherein
the selecting between saving each detected original document individually in separate files or together in one file is based on stored relationships between orientations and positions of original documents in the scanned image and a data format for saving original detected documents.

10. The method according to claim 9, wherein identifying the orientation includes identifying whether each original document is oriented vertically or horizontally in the scanned image.

11. The method according to claim 9, further comprising:
generating image data separately for each original document detected in the scanned image.

12. The method according to claim 11, further comprising:
printing an image on a sheet based on the generated image data.

13. The method according to claim 9, further comprising:
saving images of each original document in separate files or together in one file in a storage device according to the selecting according to the identified orientation and position of the original documents in the scanned image.

14. The method according to claim 9, further comprising:
correcting an inclination of the original documents extracted from the scanned image.

15. An image processing apparatus, comprising:
a memory;
a scanner including a document placement area and configured to obtain a scanned image of documents disposed in the document placement area; and
a processor configured to:
detect individual documents in the scanned image,
identify an orientation and position of each document detected in the scanned image, and
when multiple documents are detected in the scanned image, select between saving each detected individual document in separate files or together in a single file according to the identified orientations and positions of the individual documents, wherein
the memory stores relationships between a data format for saving the individual documents and the orientations and the positions of documents in the document placement area, and
the processor selects between saving each detected individual document in separate files or together in a single file based on the stored relationships in the memory.

16. The image processing apparatus according to claim 15, wherein
when the detected individual documents includes a first document oriented vertically in the document placement area and a second document oriented horizontally in the document placement area, the processor saves the first and second documents in a single file.

17. The image processing apparatus according to claim 1, wherein the processor is configured to select saving detected original documents in separate files when each detected original document is identified as vertically oriented in the document placement area.

* * * * *